United States Patent
Bartlett, Sr. et al.

(10) Patent No.: US 8,953,041 B1
(45) Date of Patent: Feb. 10, 2015

(54) WIRELESS VIDEO FOR MODEL RAILROAD ENGINES PROVIDING AN ENGINEER'S VIEW

(76) Inventors: Richard Johnson Bartlett, Sr., Houston, TX (US); William Travis Bartlett, Houston, TX (US)

( * ) Notice: Subject to any disclaimer, the term of this patent is extended or adjusted under 35 U.S.C. 154(b) by 423 days.

(21) Appl. No.: 13/560,904

(22) Filed: Jul. 27, 2012

Related U.S. Application Data

(60) Provisional application No. 61/563,309, filed on Nov. 23, 2011.

(51) Int. Cl.
 *H04N 7/18* (2006.01)

(52) U.S. Cl.
USPC ........... 348/148; 348/142; 348/151; 348/153; 348/154; 348/155; 348/64; 348/208.1; 348/208.5; 348/208.6; 348/208.16; 348/211.1; 348/211.14; 348/257; 348/333.13; 348/352; 348/372; 348/407.1; 348/563; 348/636; 348/680; 348/693; 348/677; 340/333; 340/428; 340/538; 340/635; 340/693.1; 340/855.8; 340/933; 323/205; 246/186; 246/2 R; 246/122 R; 701/19; 701/69; 701/490

(58) Field of Classification Search
USPC ........... 348/148, 142, 151, 153, 154, 155, 63, 348/208.1, 208.5, 208.6, 208.16, 211.2, 348/211.14, 257, 333.13, 352, 372, 407.1, 348/563, 636, 680, 693, 677, 723, 730; 340/333, 428, 538, 635, 693.1, 855.8, 340/933; 323/205; 246/186, 2 R, 122 R; 701/19, 69, 490
See application file for complete search history.

(56) References Cited

U.S. PATENT DOCUMENTS

| | | | | |
|---|---|---|---|---|
| 4,839,754 | A | | 6/1989 | Gami et al. |
| 5,417,388 | A | * | 5/1995 | Stillwell .................... 246/122 R |
| 6,667,771 | B1 | * | 12/2003 | Kweon .......................... 348/373 |
| 7,458,545 | B1 | * | 12/2008 | Ricks et al. .................... 246/1 R |
| 7,823,842 | B2 | * | 11/2010 | Stalzer ....................... 246/122 A |
| 2001/0022513 | A1 | | 9/2001 | Nokkonen |
| 2002/0065020 | A1 | * | 5/2002 | Meek et al. ................... 446/444 |
| 2005/0022688 | A1 | | 2/2005 | Asada |
| 2005/0052162 | A1 | * | 3/2005 | Renga ........................... 320/166 |
| 2005/0184197 | A1 | | 8/2005 | Pierson |
| 2006/0050983 | A1 | * | 3/2006 | Bendall et al. ................ 382/274 |
| 2006/0090667 | A1 | | 5/2006 | Liesman |
| 2007/0001058 | A1 | | 1/2007 | Severson |
| 2007/0241726 | A1 | * | 10/2007 | Parisi et al. .................... 323/234 |
| 2009/0162814 | A1 | | 6/2009 | Swan |
| 2011/0193964 | A1 | * | 8/2011 | McLeod ........................ 348/158 |
| 2012/0160969 | A1 | * | 6/2012 | Ring ......................... 246/187 A |

OTHER PUBLICATIONS

Pette, et al. RF & wireless technologies. Sep. 2007. Retrieved from: <URL: site.ebrary.com/lib/alltitles/docDetail. action?docID=10251297> pp. 30, 92, 95-98.

* cited by examiner

*Primary Examiner* — Jefferey Harold
*Assistant Examiner* — Mustafizur Rahman
(74) *Attorney, Agent, or Firm* — Plager Schack LLP

(57) ABSTRACT

An Engineer's View (EV) wireless video system for powered and unpowered model railroad engines is disclosed. The invention uses commercially available wireless spy cameras, powered by a custom power supply circuit which is compatible with either DC or DCC track systems. The present invention is compatible with all commercial model railroad gauge diesel engines including HO and N Gauge or may be factory installed. The EV system demonstrates a remarkably stable and realistic image of a model railroad layout. Moreover, the present invention may also provide a stable source of power to the engine where stalling could occur at points of track defects.

6 Claims, 2 Drawing Sheets

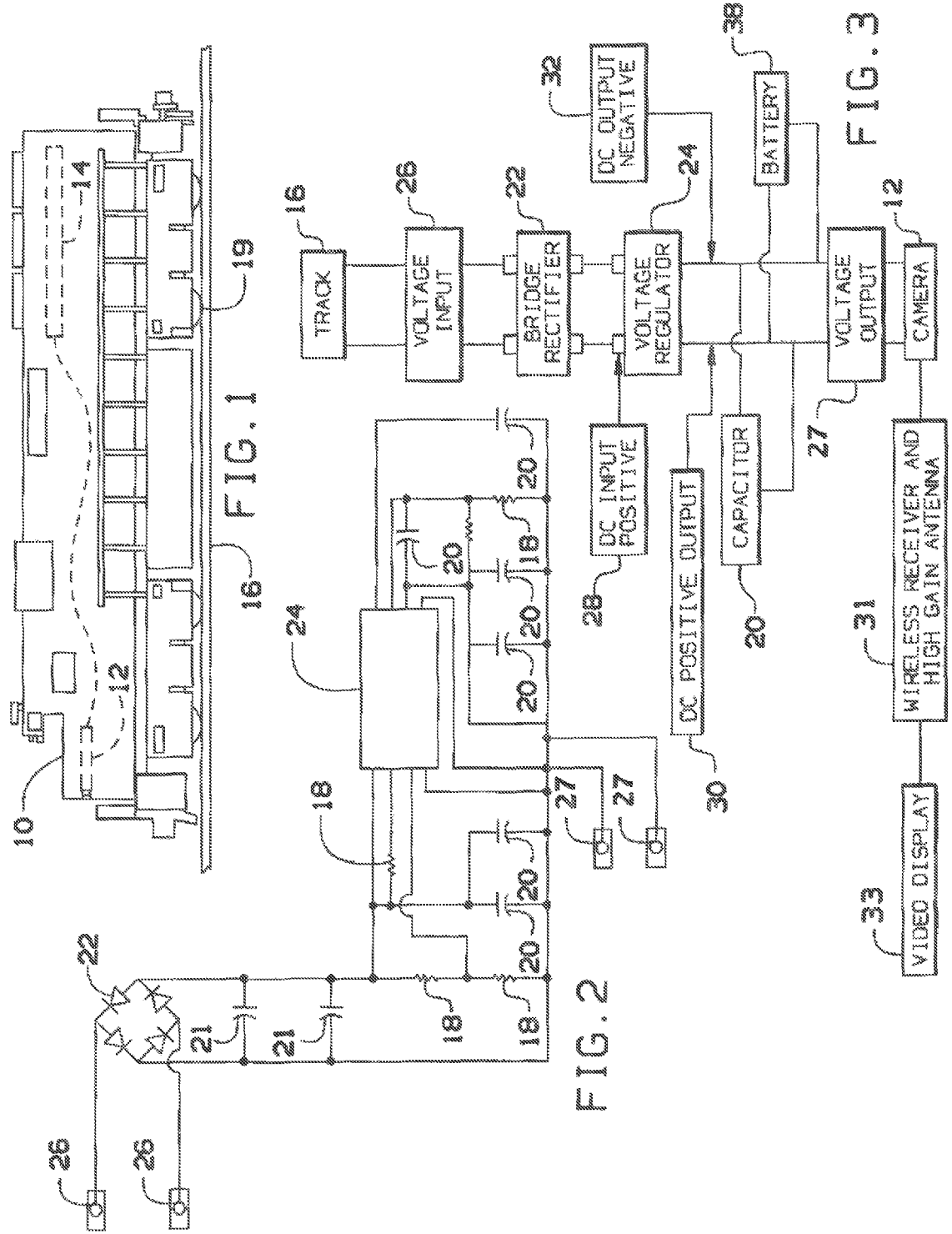

WIRELESS VIDEO FOR MODEL RAILROAD ENGINES PROVIDING AN ENGINEER'S VIEW

CROSS REFERENCE TO RELATED APPLICATIONS

This application claims priority to U.S. Provisional Patent Application 61/563,309 filed on Nov. 23, 2011.

BACKGROUND OF THE INVENTION

Realism is one of the primary goals sought by railroader hobbyists as they painstakingly build and operate their model railroad layouts. The hobbyist currently sees an un-realistic, overhead or aerial-like, view of the layout because of the relative size of the hobbyist to the size of the layout. In order to give the hobbyist the train engineer's viewpoint of the layout, the present invention installs a wireless video system inside any scale model railroad engine, which is picked up by a wireless receiver and displayed on a monitor or TV screen or recorded on a DVR.

As model railroading is the leading hobby in the world and modelers go to great effort to make detailed, realistic scenery and layout in their chosen scale of the real world, development of a system, which would provide scale-realistic motion pictures/video from an engineer's viewpoint (EV) would greatly enhance the realism that modelers desire to experience with their layouts.

PRIOR ART

The circuitry of our invention is simplified, self-contained within the model railroad engines, uses state-of-the-art electrical components just recently invented and released, and merely requires a readily available compatible commercial wireless receiver, and monitor in addition to the invention. A high-gain antenna is recommended to counter interference from devices using similar transmitting wavelengths. Brief

SUMMARY OF THE INVENTION

The present invention demonstrates a remarkably stable and realistic image of a model railroad layout. The present invention uses commercially available wireless spy cameras, powered by a custom power supply that is compatible with either DC or DCC track systems without modification. The present invention has the potential to produce a smoother running engine system under both control systems.

Key elements of the system are as follows: an electrical power supply for powering a model railroad; a track for supporting and carrying power to one or more model railroad trains from the electrical power supply; a model railroad engine for pulling one or more model railroad trains; wheels for locomotion of the model railroad engine and transmitting power from the track to the model railroad engine; a switching power supply board for taking both DC and DCC power from the wheels and supplying stable DC power to the miniature wireless spy camera; a miniature wireless spy camera for capturing video images and transmitting them wirelessly; a video receiver with antenna for receiving the video images transmitted by the miniature wireless spy camera; and a video screen for displaying the video images for viewing. Specifically, the switching power supply circuit provides: 1) input and output ranges in voltage and amperage from our board to a device only limited by what the bridge rectifier (BR) and switching voltage regulator (SVR) have as input/output capacities. These extend beyond that of the camera systems, and are limited only by the selection of these two components. The advantage of the SVR over typical regulators is the increase in current to dissipate excessive voltage from power conversion components as opposed to heat dissipation from traditional regulators; 2) one or more buffer capacitors on the input and output of the switching power supply, and one or more rechargeable batteries on the output to smooth out spikes and gaps in the power to the miniature wireless spy camera caused by track anomalies; and 3) a recharging circuit for the batteries on the output of the power supply to power the miniature spy camera, and all of which provide the appropriate voltage output from the power supply for supplying the required voltage to power the miniature spy camera. Several HO and N Gauge engines have been retrofitted with the present invention proving repeatability, stability and effectiveness.

The primary objective of the present invention is to give model railroaders a true Engineer's View of their model railroad layout with an economical system;

Another objective is to miniaturize the system to fit in locomotives built by various manufacturers from the largest scales down to N scale and eventually "Z" scale;

Another objective of the present invention is to solve the problems of voltage spikes and momentary pauses in wheel to track contact causing voltage gaps on both engine and camera system operation and reliability;

Another objective of the present invention is to transmit the video signal from the engine to the receiver wirelessly;

Another objective is to receive a transmitted signal to provide a realistic and stable video image of the Engineer's View on a monitor or TV screen or recorded on a DVR.

BRIEF DESCRIPTION OF THE SEVERAL VIEWS OF THE DRAWINGS

FIG. 1 shows a side view of a model railroad engine with one possible location for installation of the present invention;

FIG. 2 shows a circuit diagram of the switching power supply of the present invention;

FIG. 3 shows a system block diagram of the present invention; and

DETAILED DESCRIPTION OF THE INVENTION

Figure 4:
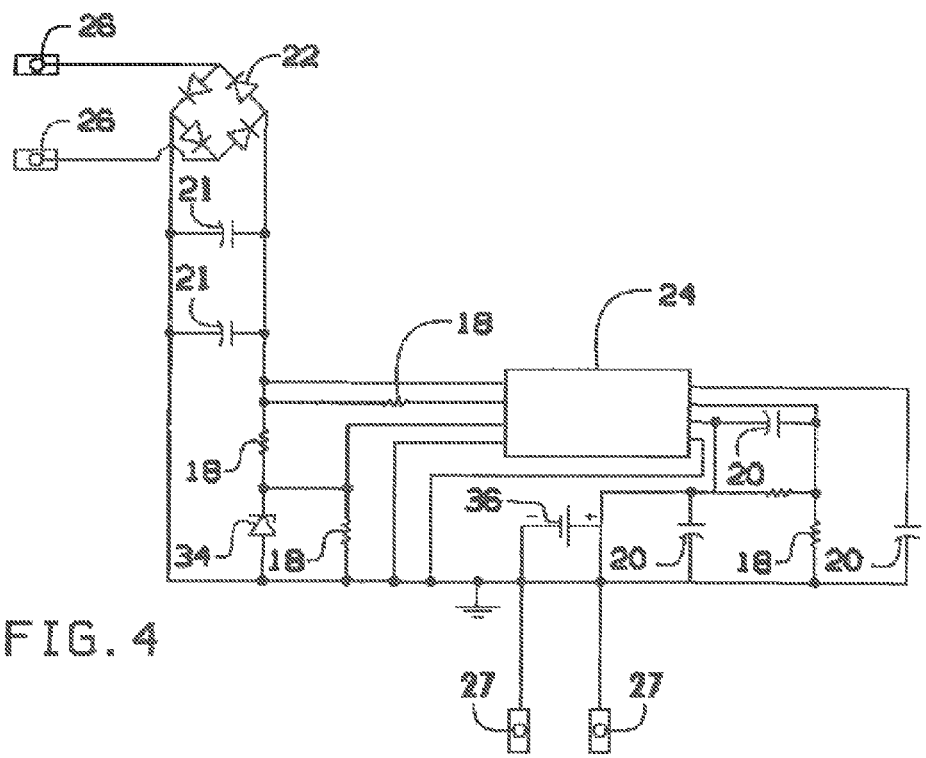
FIG. 4 shows a second embodiment of the circuit diagram of the switching power supply of the present invention.

FIG. 1 shows a side view of a typical model railroad engine with the modifications of the present invention inserted. The location of camera 12 and the power supply circuit 14, illustrates one possible location depending upon the design of the engine 10. N and HO gauge engines as in FIG. 1, have one camera 12, but our power supply circuit 14 has the capability to power two or more cameras; for instance one camera pointing forward and one camera pointing backwards. In this configuration the view from the railroad engine 10 will be coming and going at the same time. As such, the power supply circuit 14 as shown in FIG. 1 was designed to minimize the footprint to afford greater flexibility for placement and positioning in the various available model railroad engine designs from different locomotive model manufacturers. The engine is supported by tracks 16 and wheels 19 conduct electrical power (either AC or DC) from the track 16 to power the power supply circuit 14

FIG. 2, of the present invention receives power from the connectors 26 to a bridge rectifier 22 and one or more capacitors 21 between 22 and the remainder of the circuit to serve as buffering. The one or more capacitors 21 also store electrical power that is used in the event that the model railroad engine passes over areas of a track that have poor electrical contact. Voltage regulator 24 refers to a preferred type of voltage regulator that dissipates excess voltage by increasing amperage output rather than dissipating the energy as heat. This affords the circuit design of the present invention much greater longevity both in terms of real-time periods of usage as well as extended lifetime of the components. FIG. 2 shows a power supply circuit 14 compatible with camera systems with readily available AC adapters that do not match the needs of the camera 12. In these a step-down circuit is included with the camera 12, which produces appreciable heat. Thus, this design is for use with the commercial camera 12 receiving power from output connectors 27 with all of the camera 12 circuitry intact. The remainder of the power supply circuit 14 consists of a network of resistors 18 and capacitors 20 that were empirically selected.

FIG. 3 is a block diagram of the present invention. Power is conducted from the track 16 to the engine 10 through the wheels 19 and then providing a voltage input 26 as shown in FIGS. 2 and 4. Then, electricity flows through a bridge rectifier 22, and emerging as a DC positive input 28 and negative input (un-shown) and then into the voltage regulator 24 emerging as DC positive output 30 and DC negative output 32. One or more output capacitors 20 as shown in FIG. 2 and FIG. 4 and a commercial rechargeable battery (or chip battery) 38 which is recharged by the output of the power supply circuit 14, all of which maintain a constant output for the camera(s) 12 input. The camera transmits video images on a carrier wave via a built in antenna (un-shown). The modulated video images are received by an antenna attached to a wireless receiver, which may be a high-gain antenna 31. The commercial high-gain antenna 31 increases the signal to noise ratio where other wireless devices are in close proximity to the camera system. Lastly, the receiver output is a signal that may be either displayed on a video display 31 or alternatively on a monitor/TV or on any video system.

FIG. 4 shows another embodiment that reduces the heat output found in the first circuit seen in FIG. 2, and delivers the exact voltage that the camera 12 needs without the step-down circuit. This embodiment also substitutes resistors 18 and capacitors 20 that have different output values and a diode 34 that differ from those found in the circuit seen in FIG. 2. Moreover, some of the components illustrated in the design in FIG. 2 were found to be unnecessary for the direct output circuit and have been removed. FIG. 4 also shows a battery 36, which is rechargeable by the output of the switching regulator 24, thereby maintaining a constant output to the camera 12 in the event power to the power supply circuit 14 is interrupted. In like manner, the battery 36 may also be inserted into the power supply circuit 14 found in FIG. 2 in the same position of the circuit to serve the same function. The remainder of the power supply circuit 14 consists of a network of resistors 18 and capacitors 20 that were empirically selected. Connectors 26 supply power at the input to the bridge rectifier 22 and connectors 27 provides output from the power supply circuit 14 directly to the camera bypassing the camera step-down circuit. The present invention allows the hobbyist to retrofit their existing engines with easily installed kits. Model Railroad suppliers can also provide our Engineer's View system as a factory-installed option in various locomotives using the present invention.

What is claimed:

1. A system for transmitting an engineer's view from a model railroad engine to a video screen, comprising:
   an electrical power supply for powering a model railroad;
   a track for supporting and carrying power to one or more model railroad trains from the electrical power supply;
   a model railroad engine for pulling one or more model railroad trains;
   wheels for locomotion of the model railroad engine and transmitting power from the track to the model railroad engine;
   a switching power supply for taking both DC and DCC power from the wheels using existing track pickups in the engine and supplying DC power to the miniature wireless spy camera while compensating for spikes and gaps in power supplied to the engine due to track anomalies;
   a miniature wireless spy camera for capturing video images and transmitting them wirelessly;
   a video receiver for receiving the video images transmitted by the miniature wireless spy camera; and
   a video screen for displaying the video images for viewing.

2. The system of claim 1, wherein:
   the switching power supply provides increased current to dissipate excessive voltage from power conversion components.

3. The system of claim 2, further comprising:
   one or more buffer capacitors on the input of the switching power supply to smooth out spikes and gaps in the power to the miniature wireless spy camera.

4. The system of claim 3, further comprising:
   one or more capacitors and one or more rechargeable batteries on the output of the switching power supply to smooth out spikes and gaps in the power to the miniature wireless spy camera.

5. The system of claim 4, further comprising:
   a recharging circuit for the batteries on the output of the power supply for fall-back supply of the required voltage to power the miniature spy camera.

6. The system of claim 5, further comprising:
   the additional use of the recharging circuit and battery to maintain power to the engine under conditions of poor track contact.

\* \* \* \* \*